(12) United States Patent
Rendahl et al.

(10) Patent No.: US 12,318,998 B2
(45) Date of Patent: Jun. 3, 2025

(54) THREE-DIMENSIONAL PRINTER NOZZLE FOR PROGRAMMATIC NOZZLE OPENING CROSS-SECTIONAL PROFILE CONTROL

(71) Applicant: International Business Machines Corporation, Armonk, NY (US)

(72) Inventors: Randy A. Rendahl, Raleigh, NC (US); Mauro Marzorati, Lutz, FL (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 18/296,050

(22) Filed: Apr. 5, 2023

(65) Prior Publication Data

US 2024/0336008 A1   Oct. 10, 2024

(51) Int. Cl.
*B29C 64/209*   (2017.01)
*B29C 64/118*   (2017.01)
*B29C 64/295*   (2017.01)
*B29C 64/321*   (2017.01)
*B33Y 10/00*   (2015.01)
*B33Y 30/00*   (2015.01)

(52) U.S. Cl.
CPC ......... *B29C 64/209* (2017.08); *B29C 64/118* (2017.08); *B29C 64/295* (2017.08); *B29C 64/321* (2017.08); *B33Y 10/00* (2014.12); *B33Y 30/00* (2014.12)

(58) Field of Classification Search
CPC .................................................. B29C 64/209
See application file for complete search history.

(56) References Cited

U.S. PATENT DOCUMENTS

| | | | |
|---|---|---|---|
| 2019/0091928 A1* | 3/2019 | Hanano | B29C 64/112 |
| 2019/0232553 A1* | 8/2019 | Lakshman | B29C 64/112 |
| 2020/0376507 A1 | 12/2020 | Ozdemir | |
| 2021/0031436 A1 | 2/2021 | Ramia | |
| 2021/0060858 A1 | 3/2021 | Rakshit | |
| 2021/0069789 A1 | 3/2021 | Moosberg | |

FOREIGN PATENT DOCUMENTS

| | | |
|---|---|---|
| KR | 101734862 B1 | 5/2017 |
| KR | 101967699 B1 | 4/2019 |

OTHER PUBLICATIONS

Armstrong et al, A 3D Printed Morphing Nozzle to Control Fiber Orientation during Composite Additive Manufacturing, Nov. 25, 2020, vol. 6, Issue 1, 2000829, Advanced Materials Technologies, pp. 1-10 (Year: 2020).*

4D Printing Market by Material (Programmable Carbon Fiber, Programmable Wood—Custom Printed Wood Grain, Programmable Textiles), End User (Aerospace, Automotive, Clothing, Construction, Defense, Healthcare & Utility) & Geography—Global Trends & Forecast to 2019-2025. [SUMMARY] https://www.marketsandmarkets.com/Market-Reports/4d-printing-market-3084180.html <Retrieved Jan. 9, 2023>.

(Continued)

*Primary Examiner* — Timothy Kennedy
(74) *Attorney, Agent, or Firm* — Kimberly Zillig

(57) ABSTRACT

A three-dimensional (3D) printer nozzle. The 3D printer nozzle includes a nozzle body that is adapted to be deformed to allow for cross-sectional profile control during printing of a 3D printed object.

14 Claims, 5 Drawing Sheets

(56) References Cited

OTHER PUBLICATIONS

Anonymous, "3D-Printing of magnetic materials to enable advanced design features," IP.com No. IPCOM000241303D, IP.com Electronic Publication Date: Apr. 15, 2015.
Anonymous, "Method and System for Using Static Electricity Influence to Create 3D Object," IP.com No. IPCOM000264024D, IP.com Electronic Publication Date: Nov. 1, 2020.
Berger, M. (2019) Material systems used in 4D printing, https://www.nanowerk.com/spotlight/spotid=52023.php <Retrieved Jan. 9, 2023>.
Charles, K. (2021) 4D-printed robot self-assembles into a tube and rolls up hills. https://www.newscientist.com/article/2291164-4d-printed-robot-self-assembles-into-a-tube-and-rolls-up-hills/ <Retrieved Jan. 9, 2023>.
J. R. Castrejón-Pita et al., "Dynamic nozzles for drop generators", Review of Scientific Instruments 86, 115101 (2015) https://doi.org/10.1063/1.4934811.
López-Valdeolivas, M. et al. (2018). "4D Printed Actuators with Soft-Robotic Functions." Macromolecular Rapid Communications. v39, 1700710. https://doi.org/10.1002/marc.201700710.
New Scientist—Youtube Screenshot "4D-printed robot self-assembles into a tube and rolls up hills." https://www.youtube.com/watch?v=zQ_iEh7RfoA <Retrieved Jan. 9, 2023)=>.
Niiler, E. (2018) "Robots may soon actively crawl through your gut" https://www.snexplores.org/article/robots-may-soon-actively-crawl-through-your-gut <Retrieved Jan. 9, 2023>.
Smart material. wikipedia.org. https://en.wikipedia.org/wiki/Smart_material <Retrieved on Jan. 9, 2023>.

* cited by examiner

300

310 — Providing a 3D Printer Nozzle Including, a Nozzle Body Including at Least One Portion of Material Adapted to be Deformed in Order to Change a Cross-Sectional Area of the Nozzle Body, and a Plurality of Influencing Factors Located a Distance Away from the Nozzle Body and Adapted to Deform the at Least One Portion of Material when Activated

320 — Activating at Least One of the Plurality of Influencing Factors in Order to Change the Cross-Sectional Area of the Nozzle Body as Desired in Order to Print a 3D Printed Object

FIG. 5

THREE-DIMENSIONAL PRINTER NOZZLE FOR PROGRAMMATIC NOZZLE OPENING CROSS-SECTIONAL PROFILE CONTROL

The present disclosure relates generally to three-dimensional (3D) printing, and more specifically, to a 3D printer nozzle having programmatic nozzle opening with cross-sectional profile control.

3D printing, or additive manufacturing, is a process of making 3D solid objects from a digital file. Creation of a 3D printed object is achieved using additive processes. In an additive process, an object is created by laying down successive layers of material until the object is created. Each of these layers can be seen as a thinly sliced cross-section of the object. 3D printing allows the production of complex shapes using less material than traditional manufacturing methods.

SUMMARY

According to some embodiments of the disclosure, there is provided a three-dimensional (3D) printer nozzle. The 3D printer nozzle includes a nozzle body that is adapted to be deformed to allow for cross-sectional profile control during printing of a 3D printed object.

According to some embodiments of the disclosure, there is provided a 3D printing system. The system includes a heated guide pipe, wherein the heated guide pipe is adapted to deliver a molten material, and a printing nozzle attached to the heated guide pipe at a first end and having an opening at a second end, wherein the printing nozzle is adapted to be deformed to allow for cross-sectional profile control during printing of a 3D printed object.

According to some embodiments of the disclosure, there is provided a method of 3D printing. The method includes an operation of providing a 3D printer nozzle that includes a nozzle body that is adapted to be deformed to allow for cross-sectional profile control during printing of a 3D printed object. The method also includes an operation of printing the 3D printed object using the 3D printer nozzle.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 is a flowchart of a process of 3D printing, according to illustrative embodiments.

Figure 1:
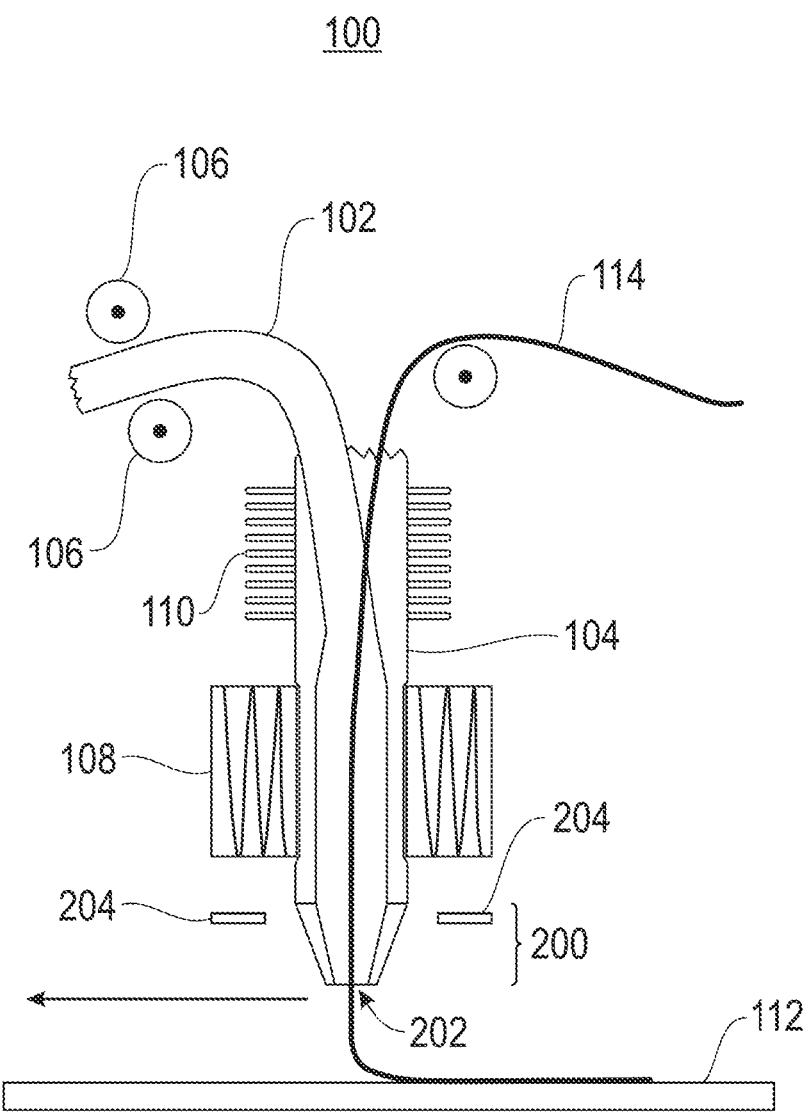
FIG. 1 is a cross-sectional view illustrating a three-dimensional (3D) printing system including a nozzle adapted with four-dimensional (4D) printing capability, according to illustrative embodiments.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to three-dimensional (3D) printing. More particularly, the present disclosure provides a 3D printer nozzle having programmatic nozzle opening with cross-sectional profile control. While the present disclosure is not necessarily limited to such applications, various aspects of the disclosure can be appreciated through a discussion of various examples using this context.

Four-dimensional (4D) printing is a process through which a 3D printed object transforms into another structure after an influence of external energy input, such as temperature, light or other environmental stimuli. A 4D printed object can be printed just like any 3D printed object. A 3D printed object can have its 3D shape changed over time. 4D printing allows objects to be 3D printed and then to transform in shape and/or material property when exposed to a pre-determined stimulus such as submersion in water, or exposure to heat, pressure, current, ultraviolet light, or some other source of energy. 4D printing technology can use commercial 3D printers, such as Polyjet 3D printers. 4D printing materials that are used with such 3D printers can be programmable and/or advanced materials, such as "smart materials" that can be a hydrogel or a shape memory polymer, for example.

"Smart materials," also called intelligent or responsive materials, are designed materials that have one or more properties that can be significantly changed in a controlled fashion by external stimuli, such as stress, moisture, electric or magnetic fields, light, temperature, pH, or chemical compounds, for example. Terms used to describe smart materials include shape memory materials (SMM) and shape memory technology (SMT) materials.

3D printing typically involves printing layers of a material that results in a static structure. 4D printing, on the other hand, can utilize a smart or programmable material that is printed by a multi-material 3D printer, for example, using inverse problem modeling, which results in a static structure having a first shape. The static structure having the first shape can then be exposed to stimuli by a mechanism of interaction, which results in a dynamic intelligent structure that can be transformed to a second shape.

4D printed objects can be used for various purposes. The shape, dimension, and/or mobility of the 4D printed objects can be changed automatically when exposed to appropriate external stimuli, like electromagnetic radiation (e.g., visible or ultraviolet light), a magnetic field, heat, electricity, acoustic energy, etc. Different 4D printed objects can include different types of smart material, and each smart material can react individually based on a particular type of external stimuli.

One way of achieving 4D printing is to 3D print a single smart material. Common single smart materials for shape shifting include shape memory polymers (SMPs) and liquid crystal elastomers (LCEs). SMPs are a group of polymers that can change shape and recover their initial shape in the presence of an external stimulus, such as heat or light. Side-chain or main-chain LCEs can undergo a large contraction along the direction of liquid crystal molecules (mesogens) under external stimulus. 4D printing can be achieved by printing a single SMP or LCE with one-way actuation or two-way reversible actuation, respectively.

There can be multi-material systems for 4D printing, which can include water- and thermal-responsive composite, fiber-reinforced or bilayer SMP composites, multi-material SMPs, and desolvation-induced multi-materials. In the latter, the volume shrinkage by desolvation of residual unreacted material can be exploited to achieve shape changing. In a multi-material structure, eigenstrains can be generated due to environmental stimuli; these eigenstrains are dependent on the relative positions and volume fractions of different materials and can drive the shape change of the structure.

Embodiments of the present disclosure can include a 3D printer nozzle including 4D or smart materials. The 3D printer nozzle head can be made with portions having 4D printing capability, such that, with applied, controlled external influencing factors (like an electric current, a magnetic field, etc.) can be exerted on the materials included in the 3D printer nozzle in order to change a cross-sectional area of the 3D printing nozzle head. The cross-sectional area of the 3D printer nozzle head can be externally influenced to provide a desired cross-sectional area, such that material coming from or through a nozzle opening can take the same shape as the cross-sectional area of the 3D printer nozzle head.

Embodiments of the present disclosure can include a system including a 3D printer nozzle head with 4D printing capability. The system can analyze a digital 3D model of an object to be printed, and identify an optimum printing head cross-sectional profile to print the object. The system can apply an appropriate level of external influencing factors such that a required cross-sectional profile of the nozzle opening can be created by deforming the 3D printer nozzle head programmatically.

Embodiments of the present disclosure can include a system including a 3D printer nozzle head with 4D printing capability based on specific nozzle opening deformation arranged in a pattern based on different circumferential positions of the nozzle opening. Based on a desired cross-sectional surface profile of the 3D printer nozzle head opening, the system can create appropriate levels of external influencing factors located at different circumferential positions around the nozzle opening so that the desired cross sectional surface profile, or area, of the 3D printer head nozzle opening can be achieved.

Embodiments of the present disclosure can include a system including a 3D printer nozzle head with 4D printing capability that can print different portions of a 3D printed object using different nozzle opening cross-sectional areas of the 3D printer nozzle head, which can be based on a digital model of the 3D printed object. The system can programmatically alter the nozzle opening cross-sectional area and can control printing speed accordingly.

Embodiments of the present disclosure can include a system utilizing multiple 3D printer nozzles with various transformability specifications. The 3D printer nozzles can have nozzle heads that can include a pattern of deformability capability of their cross-sectional areas by using smart materials in the nozzle heads. Based on desired deformability, the system can identify what types of smart materials are to be used in the 3D printer nozzles and the degree of required influencing factors used in order to deform the smart materials.

Embodiments of the present disclosure can include a system including a 3D printer nozzle head. While performing the 3D printing, a profile of material being laid depends on a cross-sectional area of the 3D printer nozzle head, with a shape of the cross-sectional area defining the profile of the material that is being laid. A material flowrate can also affect the profile of the material being laid by the 3D printer nozzle head.

Embodiments of the present disclosure can include a system including a 3D printer nozzle head capable of having a different cross sectional areas of the nozzle opening that can be dynamically changed based on shape, dimension, surface profile of a 3D object to be printed. The 3D printer nozzle can be programmatic in order to be able to dynamically change the cross sectional area of nozzle opening.

Turning to the figures, FIG. 1 is a cross-sectional view illustrating a 3D printing system 100 including a nozzle 200 adapted with 4D printing capability, according to illustrative embodiments. The system 100 is one example and the system can include additional components that are not shown. The system 100 can include a filament 102 that can be fed into a guide pipe 104 by two rollers 106. The filament 102 can be made of, for example, polylactic acid (PLA), acrylonitrile butadiene styrene (ABS), high impact polystyrene (HIPS), nylon, or high density polyethylene (HDPE), although other materials are contemplated. The guide pipe 104, and also the filament 102, can be heated by a heater block 108, with a heat sink 110 for dissipating heat located nearby, and pushed through the nozzle 200 and onto a substrate 112 where a 4D printed object can be printed as part of the substrate 112. The heater block 108 can also heat up the nozzle 200 in order to melt printing material as it moves through the nozzle 200. The substrate 112 can comprise one or more materials. Non-limiting examples of substrate materials include semiconductor wafers (e.g., silicon wafers), most metals, refractory materials, and other polymers. In some aspects, a substrate may be, without limitation, an electronic device, microchip, microelectronic device, printed circuit board, hard disk drive platter, a portion of a fluid filter, and portion of a hydrocarbon (e.g., petroleum, natural gas, or petro-chemical) processing facility such as a pipe, pipeline, fluid pumping device, distillation column, a reaction vessel, or storage tank. The system 100 can also include a carbon fiber bundle 114 that can be fed into the guide pipe 104 and out through an opening 202 in the nozzle 200 along with the heated filament 102, with both being included in the resultant 4D printed object.

The arrow in FIG. 1 indicates the direction of movement of the nozzle 200. The position of the nozzle opening 202 determines where a thin layer of the filament 102 and the carbon fiber bundle 114 is placed on the substrate 112. The nozzle 200 can be moved back and forth along an x-axis and a y-axis to at least partially create the 3D printed object. In addition, the nozzle 200 can include a circumferentially-arranged ring 204 (or ring component) that can include influencing factors (not shown in FIG. 1) that can influence a change in a cross-sectional area of the nozzle 200 as desired in order to create the 4D printed object together with the nozzle 200 being moved along the x-axis and y-axis during printing.

Additional components that are not shown or described above and that can be included in the system 100 are contemplated. For example, the system 100 can include a nozzle extruder that can control the flow and temperature of a printing material moving through the system 100. The system 100 can also include nozzle insulation that can prevent heat from escaping the nozzle 200. Further, the nozzle 200 can include a nozzle cap that can be used to keep the nozzle 200 clean and free from debris. A nozzle wiper can also be included in the nozzle 200 in order to clean the nozzle 200 and remove any material that may be stuck to the nozzle 200. A nozzle wrench can be used to adjust the nozzle 200 and change printing speed, for example. A nozzle adapter can also be included in the system 100 in order to connect the nozzle 200 to a printer. A nozzle tip can be included that is used to control the shape and size of the nozzle opening 202. In addition, a nozzle filament guide can be used to guide the filament 102 through the nozzle 200.

Although not shown, the system 100 can include a computer system for directing the formation of a 3D printed object. The computer system can comprise a central controller, comprising: a memory medium comprising program instructions; a bus coupled to the memory medium; and a processor for executing the program instructions comprising a printing control tool. The instructions cause the computer system to obtain, at the central controller, a set of specifications for the 3D object. The instructions cause the computer system to direct, by the central controller, deposition of layers of 3D printing materials and cause the computer system to direct external influencing factors to cause the nozzle 200, for example, to change its cross-sectional area using the 3D printing system 100, for example, or other suitable 3D printing systems.

Figure 2A:
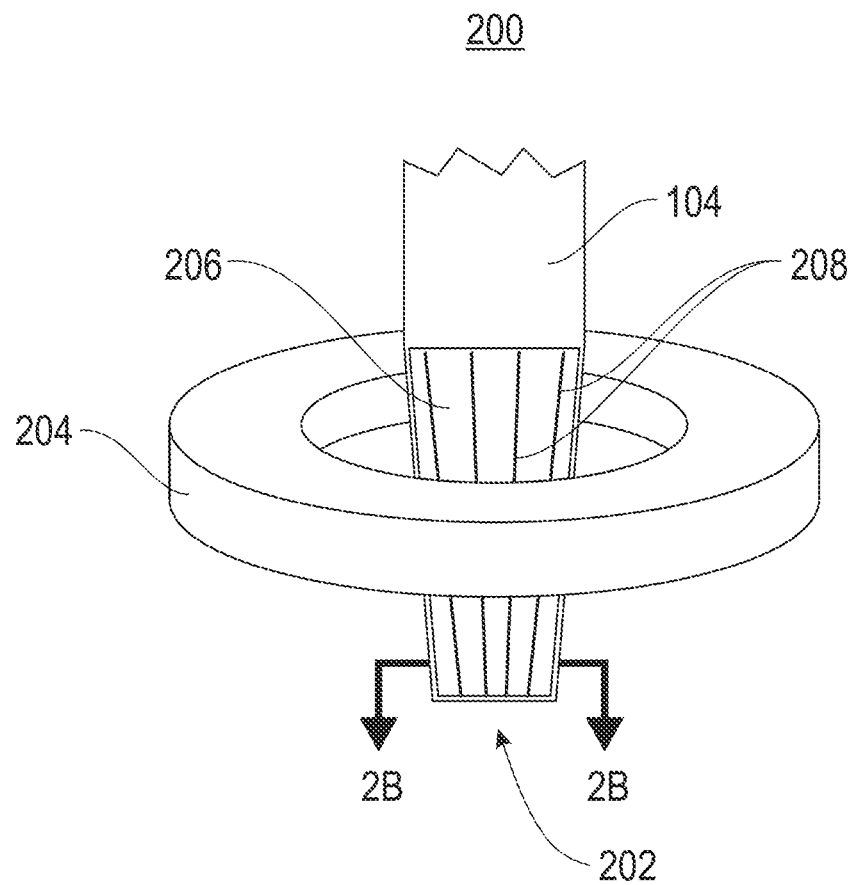
FIG. 2A is a close-up view illustrating a nozzle of the 3D printing system in FIG. 1, according to illustrative embodiments.

FIG. 2A is a close-up view illustrating the nozzle 200 of the 3D printing system 100 in FIG. 1, according to illustrative embodiments. The nozzle 200 is shown attached to a bottom portion of the guide pipe 104 of the system 100 in FIG. 1. The nozzle 200 includes a nozzle body 206 that includes a plurality of deformable portions 208 within walls of the nozzle body 206 that can comprise one or more smart materials. One or more deformable portions 208 are contemplated as being suitable. The nozzle body 206 can be made of any suitable material. The circumferential-arranged ring 204 can include influencing factors, or components, (not shown, but described more below) that can deform or change the shape of the plurality of deformable portions 208. The shape of the nozzle body 206 and opening 202 can be changed dynamically to result in 3D printing.

Figure 2B:
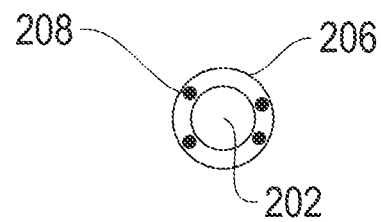
FIG. 2B is a cut-view of a nozzle body at cutting plane 2B indicated in FIG. 2A, according to illustrative embodiments.

FIG. 2B is a cut-view of the nozzle body 206 at cutting plane 2B as indicated in FIG. 2A, according to illustrative embodiments. The cross-sectional shape of the nozzle opening 202 shown is generally circular, since no deformation of the nozzle body 206 is described with regard to the embodiment shown in FIG. 2A.

Figure 3A:
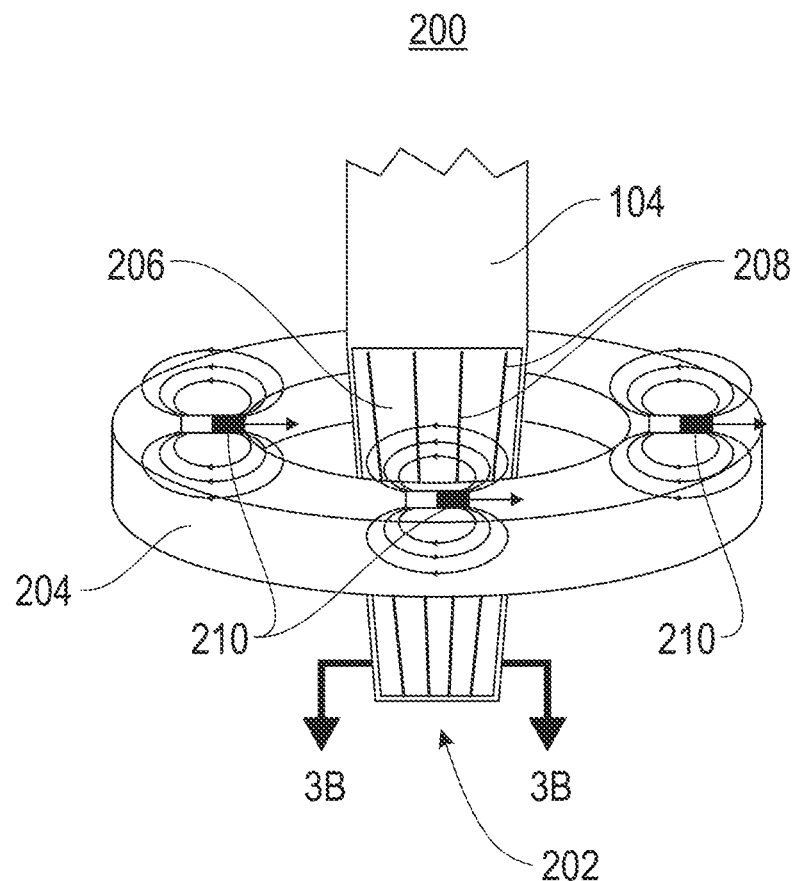
FIG. 3A is a close-up view illustrating a nozzle of the 3D printing system in FIG. 1, according to illustrative embodiments.

FIG. 3A is another close-up view illustrating the nozzle 200 of the 3D printing system 100 in FIG. 1, according to illustrative embodiments. The nozzle 200 is shown attached to a bottom portion of the guide pipe 104 of the system 100 in FIG. 1. The discussion above of components of the nozzle 200 with regard to FIG. 2A also applies to FIG. 3A. Additionally, FIG. 3A includes a plurality (three (3) visible in FIG. 3A) of influencing factors 210, or components, in the circumferentially arranged ring 204, which surrounds and is located a distance from the nozzle body 206. In the example shown, the influencing factors 210 are electromagnets. The influencing factors 210, based on their position and activity, can cause the deformable portions 208 in the nozzle body 206, which have 4D printing capability, to change shape thereby effecting a change in a cross-sectional shape of the nozzle body 206. Other suitable types of influencing factors 210 that can be used with smart materials that make up the deformable portions 208 are contemplated. The distance between the influencing factors 210 and the deformable portions 208 in the nozzle body 206 can depend upon the identity of the materials used to form the deformable portions 208 and also upon the type of influencing factors 210 included. Besides electromagnets, some other influencing factors 210 that can interact with the deformable portion 208 are contemplated. For example, other influencing factors can involve the use of electricity or electric fields that can interact with the deformable portions 208. Other examples of influencing factors can include heat, centrifugal forces or air/compressed air forces or mechanical forces to deform the deformable portions 208.

The disclosure also contemplates deforming the nozzle 200 by other means that do not involve including the deformable portions 208 in the nozzle 200 to change the shape of the nozzle 200. One example of a method of deforming the nozzle can involve the use of electricity. An electric current can be used to heat the nozzle 200 in order to soften the nozzle 200 and make it deformable. Electrical pulses can be used to create vibrations that can deform the nozzle 200. Magnetic fields can be used to apply force to the nozzle 200 to cause deformation. Electromagnets can be used to provide a magnetic field around the nozzle 200 and cause deformation. An electrostatic charge can be used to attract or repel particles in the nozzle 200 to cause deformation. Another example of deforming the nozzle 200 without the use of the deformable portions 208 is the use of mechanical presses or pressure plates that can apply pressure to the nozzle 200 to cause deformation. Another example is to use actuators or mechanical tools to physically move the nozzle 200 in order to deform the nozzle 200 to a desired shape. Mechanical jigs can be used to hold the nozzle 200 in place and also to apply forces to deform the nozzle 200. Yet another example is the use of vacuum chambers in order to create a vacuum or vacuums around the nozzle 200 to cause deformation. A further example is using ultrasonic vibration to create vibrations that can deform the nozzle 200. As another example, a pneumatic system can be used to apply pressure to the nozzle 200 to deform the nozzle 200. In addition, lasers can be used to cut and shape the nozzle 200 to cause deformation of the nozzle 200. Yet another way to deform the nozzle 200 can be to use a chemical reaction to soften material that makes up the nozzle 200 so that it can be deformed. Other suitable methods and systems that can be used to deform the nozzle 200 are also contemplated.

Figure 3B:
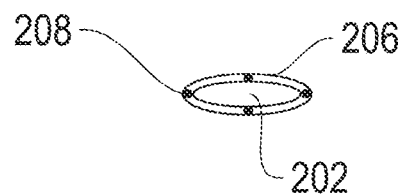
FIG. 3B is a cut-view of a nozzle body at cutting plane 3B indicated in FIG. 3A, according to illustrative embodiments.

FIG. 3B is a cut-view of the nozzle body 206 at cutting plane 3B indicated in FIG. 3A, according to illustrative embodiments. The arrangement of the influencing factors 210 results in locations of the deformable portions 208 within the nozzle body 206, which results in an elliptical cross-sectional shape of the nozzle opening 202, as shown in FIG. 3B. The influencing factors 210 are not shown as being activated in the figure.

Figure 4A:
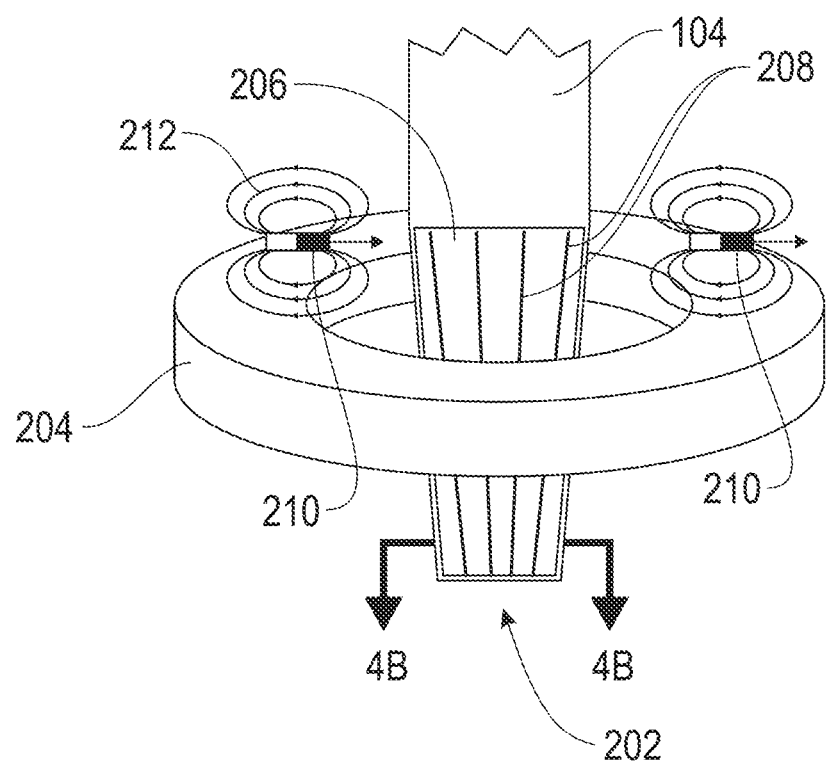
FIG. 4A is a close-up view illustrating a nozzle of the 3D printing system in FIG. 1, according to illustrative embodiments.

FIG. 4A is another close-up view illustrating the nozzle 200 of the 3D printing system 100 in FIG. 1, according to illustrative embodiments. The nozzle 200 is shown attached to a bottom portion of the guide pipe 104 of the system 100 in FIG. 1. The discussion above of components of the nozzle 200 with regard to FIGS. 2A and 3A also applies to FIG. 4A.

Two influencing factors 210 are included in the circumferential arranged ring 204. Magnetic field lines 212 are shown that schematically represent the magnetic fields that can deform the deformable portions 208 in the nozzle body 206 in order to change the shape of the nozzle opening 202.

Figure 4B:
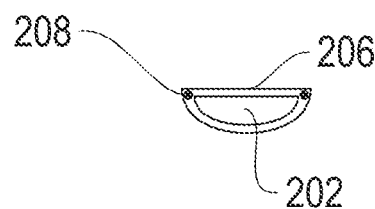
FIG. 4B is a cut-view of a nozzle body at cutting plane 4B indicated in FIG. 4A, according to illustrative embodiments.

FIG. 4B is a cut-view of the nozzle body 206 at cutting plane 4B indicated in FIG. 4A, according to illustrative embodiments. As shown, the nozzle opening 202 has been deformed in order to form a semi-circular, cross-sectional shape. Various other cross-sectional shapes are possible, and the illustrated shape is one example. The influencing factors 210 can change the cross-sectional shape and area of the nozzle opening 202, based on a desired need of the 3D printing. Appropriate influencing factors 210 can be applied around a circumference of the nozzle body 206 and can deform the nozzle opening 202 cross-sectional area.

The nozzle 200 used in the 3D printing system 100 can have a wide range of printing capabilities based on the 4D (or smart) material used and characteristics of the influencing factors 210. Some characteristics of the influencing factors 210 that can affect the range of capabilities of the nozzle 200 include, for example, a number of influencing factors 210 included, a density of the influencing factors 210 in the circumferentially arranged ring 204, a distribution of the influencing factors 210 within the circumferentially arranged ring 204, and a range of influence by the influencing factors 210 (possibly based on, e.g., electric current, heat range, magnetic strength, etc.).

Embodiments of the present disclosure can include a nozzle 200 that can increase or decrease an overall area of the nozzle opening 202 using an even distribution of influencing factors 210 around the nozzle body 206. The overall area of the nozzle opening 202 can influence horizontal resolution of printing from the nozzle 200. For example, a larger overall area of the nozzle opening 202 results in less horizontal resolution. The overall area of the nozzle opening 202 can also influence vertical resolution of printing from the nozzle 200. Using an even distribution of the influencing factors 210 can require a variable speed nozzle movement to adjust vertical resolution or drives using a same configuration across an entire layer to assure a common vertical impact.

Embodiments of the present disclosure can include a nozzle 200 that can be considered transformational. The nozzle 200 can be shaped by selectively using individual influencing factors 210, which allows for variations in horizontal resolution while maintaining a consistent vertical resolution. The nozzle opening 202 can be narrowed in order to reduce a total area of the nozzle opening 202 while maintaining a consistent volume per square area. The nozzle 200 can allow for more precision without requiring a variable speed nozzle movement to adjust flow.

Embodiments of the present disclosure can include a system that, before printing each layer, can analyze required precision within that layer and map an appropriate nozzle configuration. The nozzle configuration can be consistent for the entire layer or adjusted in shape or size as the layer is printed (e.g., accounting for thickness with shape or head speed). Use of variable shapes within or across different layers allows more rapid printing by taking advantage of larger nozzle sizes for areas lacking needed precision while leveraging smaller nozzle sizes for finer detail work without changing nozzles during printing.

Embodiments of the present disclosure can include a system that combines 4D actuation of a cross section of a nozzle body that is combined with minor 3D movements (e.g., shifting axis of a resulting cross-section outlet of a printing head through a gimbal) to further accentuate a way in which material is laid onto a substrate.

FIG. 5 is a flowchart of a process 300 of 3D printing, according to illustrative embodiments. An operation 310 of the process 300 can be providing a 3D printer nozzle. The 3D printer nozzle can include: a nozzle body including at least one portion of material adapted to be deformed in order to change a cross-sectional area of the nozzle body; and a plurality of influencing factors located a distance away from the nozzle body and adapted to deform the at least one portion of material when activated. The process 300 can also include an operation of activating at least one of the plurality of influencing factors in order to change the cross-sectional area of the nozzle body as desired in order to print a 3D printed object.

The process 300 can also include an operation of dynamically changing the activating of at least one of the plurality of influencing factors in order to print the 3D printed object. In addition, the process 300 can include an operation of controlling a printing speed of the 3D printing as desired in order to print the 3D printed object.

Embodiments of the present disclosure can include a process of 3D printing. The process includes an operation of providing a 3D printer nozzle that includes a nozzle body that is adapted to be deformed to allow for cross-sectional profile control during printing of a 3D printed object. The process can also include an operation of printing the 3D printed object using the 3D printer nozzle.

Embodiments of the present disclosure can include a process that includes selecting a digital 3D model. A digital model can be selected for 3D or 4D printing. Features of the digital model can be analyzed to determine a finest granularity captured in the model. Characteristics of a printer nozzle can be assessed against that finest granularity to determine if it can achieve that detail. If the detail may not be achieved by the printer nozzle, the user can be notified of an impact on a result due to such a shortcoming. Alternatively, the user can provide acceptable tolerances. If the printer nozzle is deemed acceptably precise, the system can print the model.

Embodiments of the present disclosure can include a process that includes generating 3D printer test strips using a pattern testing phase. A 3D printer can print test strips, and can allow a digital scanner to evaluate print patterns on the test strips. Like a test page on a printer, the 3D printer may print a variety of configurations followed by a 3D scan to evaluate the results. The result may be used to refine the influencing factors to achieve a desired result. Alternatively, the 3D printer may use the results to predict printing behavior given preset influencing factors settings. Generally, the test could be used when the 3D printer is moved to a new environment or a print media has been changed (i.e., a new printer cartridge in an ink jet printer). In some cases, the test page can be tuned based on the digital model to be printed.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

"3D printer" is defined as "a machine used for 3D printing" and "3D printing" is defined as "the fabrication of objects through the deposition of a material using a print head, nozzle, or another printer technology."

Synonyms associated with and encompassed by 3D printing include additive fabrication, additive processes, additive techniques, additive layer manufacturing, layer manufacturing, and freeform fabrication. "Additive manufacturing (AM)" is defined as "a process of joining materials to make objects from 3D model data, usually layer upon layer, as opposed to subtractive manufacturing methodologies. Additive manufacturing (AM) may also be referred to as rapid prototyping (RP). As used herein, "3D printing" is generally interchangeable with "additive manufacturing" and vice versa.

"Printing" is defined as depositing of a material using a print head, nozzle, or another printer technology.

In this disclosure, "3D or three dimensional article, object or part" means an article, object or part obtained by additive manufacturing or 3D printing as disclosed above.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of the slices may vary.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A three-dimensional (3D) printer nozzle comprising:
   a nozzle body that is adapted to be deformed to allow for cross-sectional profile control during printing of a 3D printed object, wherein the nozzle body includes at least one deformable portion formed of one or more smart materials;
   a plurality of influencing factors located a distance away from the nozzle body and adapted to deform the at least one deformable portion when activated; and
   a ring component that is circumferentially arranged around the nozzle body, wherein the ring component includes the plurality of influencing factors.

2. The 3D printer nozzle of claim 1, wherein the plurality of influencing factors include at least one electromagnet.

3. The 3D printer nozzle of claim 1, wherein the plurality of influencing factors are selected from a group consisting of a magnet, an electrical field, a heat source, a centrifugal force, an air force, a compressed air force, and a mechanical force.

4. The 3D printer nozzle of claim 1, wherein the one or more smart materials includes a 4D printing material.

5. The 3D printer nozzle of claim 1, wherein the nozzle body includes a nozzle opening, wherein a cross-sectional area of the nozzle opening is adapted to be changed by deformation of the at least one deformable portion.

6. The 3D printer nozzle of claim 5, wherein the cross-sectional area of the nozzle opening can be changed dynamically by at least one of the plurality of influencing factors that can dynamically deform the at least one deformable portion.

7. A 3D printing system comprising:
   a heated guide pipe, wherein the heated guide pipe is adapted to deliver a molten material;
   a printing nozzle attached to the heated guide pipe at a first end and having an opening at a second end, wherein the printing nozzle is adapted to be deformed to allow for cross-sectional profile control during printing of a 3D printed object, and the printing nozzle includes at least one deformable portion formed of one or more smart materials;
   a plurality of influencing factors located a distance away from the printing nozzle and adapted to deform the at least one deformable portion when activated; and
   a ring component that is circumferentially arranged around the printing nozzle, wherein the ring component includes the plurality of influencing factors.

8. The 3D printing system of claim 7, wherein the at least one deformable portion of the printing nozzle includes at least one four-dimensional (4D) printing material adapted to be deformed in order to change a cross-sectional area of the printing nozzle and the opening.

9. The 3D printing system of claim 7, wherein the plurality of influencing factors include at least one electromagnet.

10. The 3D printing system of claim 7, wherein a cross-sectional area of the printing nozzle can be changed dynamically by dynamically deforming the at least one deformable portion.

11. A method of three-dimensional (3D) printing comprising:
   providing a 3D printer nozzle that includes a nozzle body that is adapted to be deformed to allow for cross-sectional profile control during printing of a 3D printed object, wherein the nozzle body includes at least one deformable portion formed of one or more smart materials and adapted to be deformed in order to change a cross-sectional area of the nozzle body, and wherein the 3D printer nozzle includes a plurality of influencing factors located a distance away from the nozzle body and adapted to deform the at least one deformable portion when activated, a ring component that is circumferentially arranged around the nozzle body that includes the plurality of influencing factors;
   activating at least one of the plurality of influencing factors in order to change the cross-sectional area of the nozzle body as desired in order to print the 3D printed object; and
   printing the 3D printed object using the 3D printer nozzle.

12. The method of claim 11, further comprising:
   dynamically changing the activating of at least one of the plurality of influencing factors in order to print the 3D printed object.

13. The method of claim 11, further comprising:
   controlling a printing speed of the 3D printer nozzle as desired in order to print the 3D printed object.

14. The method of claim 11, wherein the nozzle body includes a nozzle opening, wherein a cross-sectional area of the nozzle opening is adapted to be changed by deformation of the at least one deformable portion.

* * * * *